Aug. 26, 1930.  H. M. HARDY  1,774,002
COMPRESSION AND OIL CONTROL PISTON RING
Filed Feb. 16, 1928   2 Sheets-Sheet 1
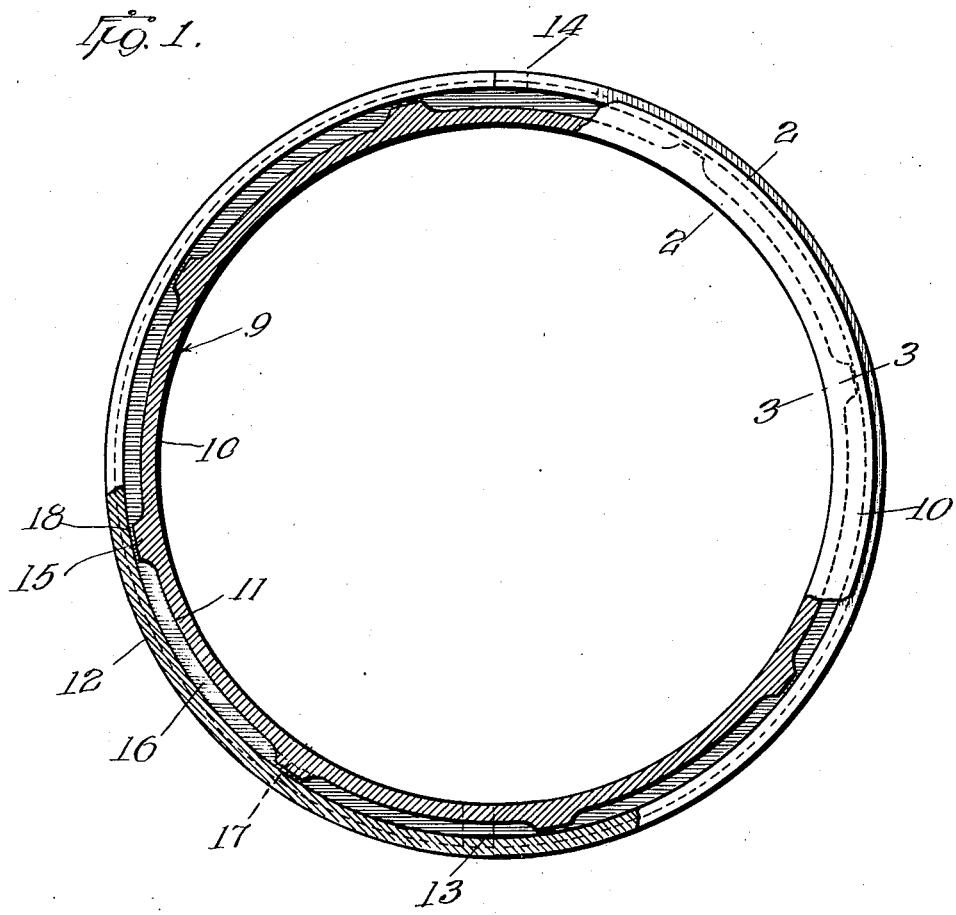
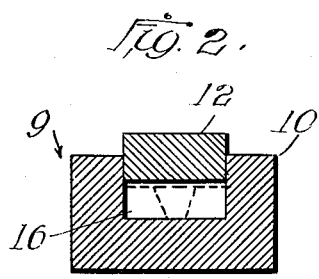 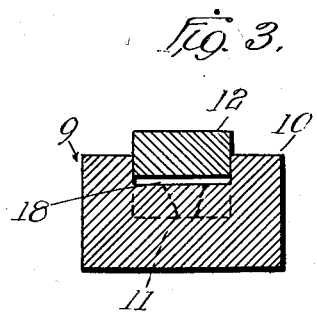 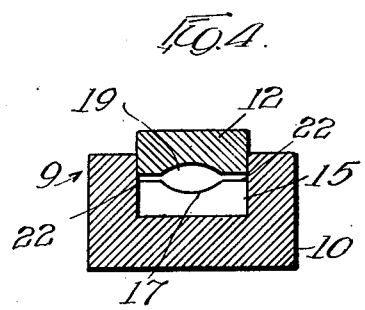
Inventor
Hazlett M. Hardy.
By Fisher, Towle, Clapp & Soans, Attys Aug. 26, 1930.  H. M. HARDY  1,774,002
COMPRESSION AND OIL CONTROL PISTON RING
Filed Feb. 16, 1928  2 Sheets-Sheet 2
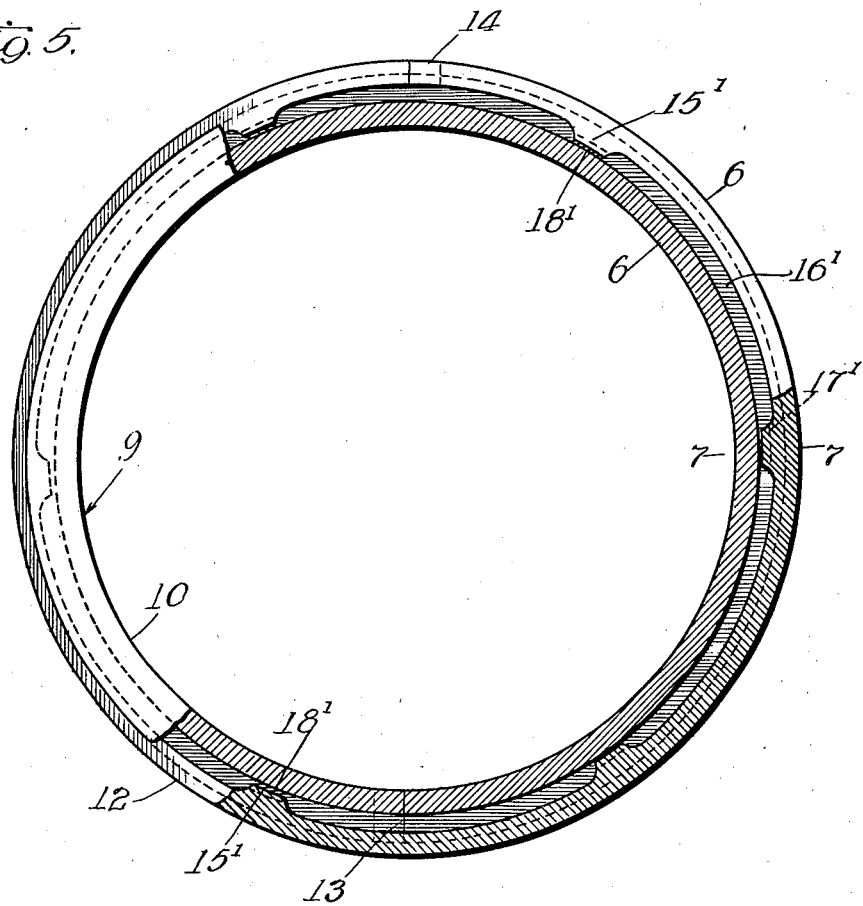
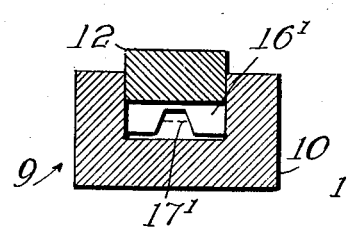 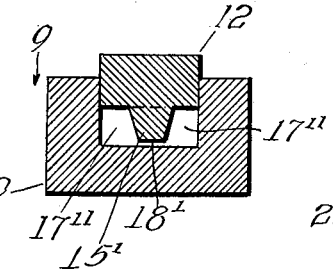 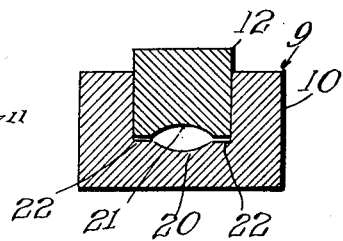
Inventor
Hazlett M. Hardy Patented Aug. 26, 1930

1,774,002

UNITED STATES PATENT OFFICE

HAZLETT M. HARDY, OF MUSKEGON, MICHIGAN

COMPRESSION AND OIL-CONTROL PISTON RING

Application filed February 16, 1928. Serial No. 254,712.

This invention relates to piston rings adapted for various types of engines or compressors such as internal combustion or steam engines, compressors, hydraulic equipment, pumps and other compression practices, and designed as a compression and oil control packing or piston ring applicable thereto.

The invention relates more particularly to improvement upon the construction shown in my co-pending application, Serial No. 250,525, filed January 30, 1928, and relates more specifically to the construction of the rings and by which a series or plurality of compression or throttle chambers are provided between the units or rings of the assembly embodying a peripherally grooved carrier ring and a bearing ring mounted in the carrier ring groove.

A further object of the invention is to provide a ring of the type described in which bridges or webs are formed on either the bottom wall of the groove in the carrier ring or the inner wall of the bearing ring and disposed normally in contact, or substantially so, with the co-acting wall or face of the other ring so as to produce a series of compression or throttle chambers for oil or other fluid as used in compression practice, said chambers communicating if desired to provide uniform or balanced pressure.

The primary intent is that there be a contact or constant engagement between the bridges or webs carried by one ring with the adjacent wall opposing them on the other ring, providing therebetween a plurality of chambers either independent of each other or continuously connected by passages through the bridges or webs, this construction being applicable in modified form to the prior form of the invention and producing therein an improvement in the functioning thereof.

The advantage of this construction over the construction of other piston rings heretofore devised is, that the throttle chamber or chambers provided for between the carrier ring and the bearing ring afford means for the storage of surpluses of oil or lubricant which will be prevented from passing to the compression head, the pressures being built up on a compression stroke of a piston driving these surpluses between the rings and into the chamber or chambers, and the oil or lubricant so stored escaping from the chambers on the backward or vacuum stroke of the piston, at which time the bearing ring will contact most firmly with the land formed by the outer or forward flange of the carrier ring and the line of least resistance will exist between the bearing ring lower surface and the carrier ring inner flange.

With this construction a more generous supply of oil or lubricant can be distributed within and upon a cylinder wall for the entire distance of a piston stroke or travel, the oil conducted on and in the rings constitute a seal for the forces of compression as they build up, and the chambers between the two rings afford means whereby the surpluses of oil or lubricant (while resisting the forces of compression) may be driven through the line of least resistance existing between the two rings and into the throttle chamber or chambers, thereby producing the result of more perfect seal, better lubrication, prevention of "blow-by" of fuel and oil pumping in combustion engines and building up pressure between the rings to force the bearing ring against the cylinder wall and prevent its collapsing under high pressure and high speeds.

With the above and other objects in view, the invention consists in certain novel combinations and arrangement of parts, the relation of which will be more thoroughly established in the following description particularly emphasizing and pointing out the same.

In the accompanying drawings:—

Fig. 1 is a sectional elevation of one form of compression and oil control piston ring constructed in accordance with the invention and showing the bridges or webs formed on the carrier ring.

Figs. 2 and 3 are sectional views taken on the section lines 2—2 and 3—3 of Figure 1.

Fig. 4 is a sectional view of a modification.

Fig. 5 is a view similar to Figure 1 but showing the bridges or webs formed on the bearing ring.

Figs. 6 and 7 are sectional views taken on the section lines 6—6 and 7—7 of Figure 5, and Fig. 8 is a sectional view of a further modification.

Referring to the drawings in detail, and particularly to the form shown in Figures 1 to 3 inclusive, the compression and oil control piston ring is designated as an entirety at 9 and comprises an inner or carrier ring 10 which is adapted to seat in a groove on any piston used in compression practice, whether for the object of securing compression of gas in internal combustion or gasoline motors, crude oil engines or those of the Diesel type, air or other compressors, steam engines, and so forth.

This carrier ring is of channel-shaped cross section and has a groove or channel 11 in its periphery adapted to receive a bearing ring 12 therein and between flanges formed at the sides of the carrier ring. The flanges are preferably parallel to each other and at right angles to the axis of the ring and of such length or width as to be within or below the peripheral face of the piston and of the bearing ring when the carrier ring is inserted in a piston groove with the bearing ring in the carrier ring groove and engaging the cylinder wall. That is, the radial thickness of the carrier ring through the flanges is less than the radial depth of the groove in the piston. Each ring is provided with a stepped cut joint or split ends as indicated at 13 and 14 respectively so that, owing to the resiliency and expansile tendency of the rings, these joints will be normally open.

However, there is provided between the rings spaced bridges or webs 15. These are preferably formed on one of the rings and as indicated in Figures 1, 2 and 3 are produced in the floor of the carrier ring or the bottom wall of the groove therein at suitable intervals, preferably equi-distantly spaced apart and tapered as shown radially or sloping or beveled at their ends in longitudinal dimension. In the form shown, eight of such webs are illustrated, though there is no restriction as to number and the latter may vary according to needs. These webs produce compression or throttle chambers 16 between them and the rings, although essentially there is a compression or throttle chamber between the carrier and the bearing ring, especially where the webs are grooved circumferentially or longitudinally as indicated at 17. If these webs are not grooved peripherally, they provide a series of relatively independent chambers with no communication or free communication between them except slight spaces indicated at 18 between their outer faces and the inner wall or face of the bearing ring 12.

The bearing ring is of uniform width and cross section throughout, and in this respect may be termed a plain ring usually wider than it is thick. The bearing ring fits within the groove of the carrier ring in contact or substantially in contact with the outer faces or bridges 15 and between the side flanges 13 of the carrier ring but in such a manner as to project from the peripheral edges of the flanges. In other words, the bearing ring is of greater radial thickness than the radial dimension or projection of the flanges 13 from the outer surfaces of the webs 15 so that only the bearing ring will come in contact with the interior cylinder wall and the peripheral edges of the flanges will be spaced from the cylinder wall, thus securing minimum contact or bearing engagement of the ring as a whole with the cylinder wall and reducing friction and wear thereon. However, the depth of the groove in the carrier ring at the chambers or between the webs is greater in radial dimension than the thickness radially of the bearing ring. While the spaces 18 may be relied upon to establish continuous communication between the chambers so that in actual practice oil or other fluid will escape therebetween, this continuity of the chambers, so as to produce a relatively single compression or oil control throttle chamber, may be accentuated or emphasized to establish free communication by reason of central longitudinal grooves 17 in the webs as already described. Normally, the bearing ring seated on the bridges or webs in the floor of the groove in the carrier ring, is supported on or engaged with both lateral sides by the flanges or inner faces thereof on the carrier ring which are arranged at right angles to the axes of both rings when assembled. Therefore, the line of least resistance to fluid under pressure is between the co-acting faces of the rings. Thus, under active or compression stages, oil is forced and between the two rings and into the throttle chamber or chambers, and is trapped thereon to form an effective seal against loss of compression and insure maximum compression. At the same time this oil is conserved as a lubricant and owing to the fact that the bearing ring is constantly in contact with the cylinder, the escape of the oil to the cylinder head in an internal combustion engine and the burning thereof with resultant carbon formation and inefficiency of the motor is obviated. Also, uniformity of compression between the rings is provided by reason of the communication established between the chambers and a uniform seating of the rings and particularly the bearing ring against the cylinder wall, is assured with resultant ease of operation and minimum wear on the co-acting working parts. On the intake or suction stroke of the piston, the pressure on the rings as assembled is opposite to the pressure therein during the compression stroke and therefore the surplus of oil forced into the throttle chamber or chambers during compression, is permitted to escape downward and out between the rings, since, on the suction stroke the assembled rings are forced upward from contact with the lower lands or flanges in the carrier ring and piston grooves—and into contact with the upper lands or flanges thereof.

The line of least resistance for the flow of fluid under pressure into the throttle chamber exists between the two rings for the reason that the combined expansile forces of the two rings exerted on the cylinder wall by the bearing ring, prevents the "blow by" at the periphery of the bearing ring, and there is at the same time a weaker point of attack between the rings as assembled. The fluid readily finds this passage and follows it between the rings and into the chambers between them, only to be throttled therein to build up pressure and force the bearing ring into firm contact with the cylinder wall.

In the form shown in Figure 4 not only are or may the webs or bridges 15 be provided on one of the rings with grooves 17 as described, but such webs may be omitted, and with or without, shallow grooves 19 are or may be produced centrally in the transverse dimension of the bearing ring running circumferentially or longitudinally. These coacting groves result in establishing communication between the chambers. These grooves may be of concave or other cross section.

In the form of the invention shown in Figure 5, similar carrier and bearing rings are provided except that the bridges or webs 15' are formed on the bearing ring as distinguished from the carrier ring and project inwardly into the groove of the carrier ring. Step cuts or other joints are provided in each of the rings as heretofore described, and it is to be understood that any desired form of opening may be provided at the closure. This construction in which the bridges or webs are made a part of the bearing ring, is the reverse of the structure shown in Figures 1 to 4 inclusive in which the bridges or webs are formed with and in the floor or bottom of the groove in the carrier ring. However, either construction provides the compression or throttle chambers between the two rings and the carrier ring in the forms shown in Figures 5 to 8 inclusive also has the flanged walls which support the bearing rings.

Primarily, the bridges, whether formed on the carrier ring or the bearing ring contact with the other ring at its opposing face—that is, the webs or bridges 15 on the carrier ring contact or substantially contact with the inner face of the bearing ring in the form shown in Figure 1 while the bridges or webs 15' on the bearing ring, as shown in Figure 5, contact with the floor or bottom of the groove in the carrier ring. The chambers thus provided as indicated at 16' may be arranged independently, allowing for communication therebetween only at the spaces 18' or grooves 17' of varying depths as indicated in solid and dotted lines in Figures 5, 6, and 8 may be formed in said bridges or webs of the bearing ring to establish communication between the compression and throttle chambers. Of course, in this form the radial thickness of the bearing ring through the webs is greater than the radial depth of the groove in the carrier ring so that the bearing ring will project from the peripheral edges of the flanges of the carrier ring or other part of the carrier ring itself, so as to prevent contact of the latter with the cylinder wall and insure considerable thickness for wear on the bearing ring against the cylinder wall the same as in the forms shown in Figures 1 to 4 inclusive. The grooves or channels in the webs or bridges in each instance permit of balanced force of compression entering the chambers. The same construction may be carried out by radially grooving the bridges when constructed or made a part of the bearing ring and the grooves may be formed centrally or at the sides as shown in Figures 6 and 7, the grooves or channels in the latter form being designated at 17''. It may also be mentioned that the channel or channels through the bridges as described are secondary in importance in view of the fact that the balance of the forces of compression and oil may be established or equalized by the communication between the chambers at points between the bridges and the bottom wall of the groove in the carrier ring. This is primarily proposed as a precautionary measure in assuring the objects of the invention as a whole.

In the form of the invention shown in Figure 8, the reverse of that construction shown in Figure 4 is illustrated, in which a concave groove or channel 20 is provided in the bottom wall in the groove of the carrier ring and shallow concave groove or channel 21 is provided in the webs or bridges, these grooves being concaved transversely of the rings and extended circumferentially or longitudinally of the co-acting faces, either continuously or broken by the webs. Obviously, the depth of the grooves may be varied according to the requirements and a continuous chamber will be produced between both rings when brought to closure.

In the forms shown in Figures 4 and 8, the portions 22 may be brought in contact in the quiescent or normal condition of the rings and the pressure trap between the rings under the compression or working stroke will separate the rings tending to force the bearing ring into engagement with the cylinder wall, a desideratum in compression practice for producing maximum compression and efficiency. Obviously, other ways of securing the throttle chamber and the rings may be devised. In this respect the invention lies broadly in the scheme rather than in the specific details, although the forms shown and described are considered especially desirable and advantageous.

While I have shown and described my invention in a preferred form, I am aware that various changes and modifications may be made without departing from the principles of the invention, the scope of which may be determined by reference to the appended claims.

I claim as my invention:

1. In a compression and oil control piston ring, comprising an outer ring split on one side and encircling an inner ring likewise split on one side and grooved about the circumference, and a plurality of webs on one of the rings and projecting between the rings, forming a plurality of chambers between the two rings when assembled one within the other and brought to a closure.

2. In a compression and oil control piston ring, comprising an outer ring split on one side and an inner ring grooved about its circumference and split on one side, said inner ring having flanged portions turned outwardly from the axis thereof and creating said groove, and a plurality of webs on one of the rings and disposed about and within said groove, each web being of substantially equal dimension radially while less in dimension than the radial dimension of the flanges in which the outer ring is mounted while seated on the plurality of webs and supported laterally by the flanges of the inner ring and forming a plurality of chambers between the two rings when both rings are assembled and brought to a closure.

3. In a compression and oil control piston ring, comprising an outer ring split on one side and an inner ring grooved about its circumference and split on one side, said inner ring having flanged portions turned outwardly from the axis thereof and creating said groove, and a plurality of webs projecting into the space between the rings and disposed about and within said groove, each web being of equal radial dimension while less in dimension than the radial dimension of the flanges in which the outer ring is mounted while seated on the plurality of webs and supported laterally by the flanges of the inner ring, and a chamber communicating between the two rings when both rings are assembled and brought to a closure and extending through the webs.

4. In a compression and oil control piston ring, comprising a bearing ring split on one side and encircling a carrier ring likewise split on one side and grooved about its circumference, and a plurality of webs projecting inwardly from the inside wall of the bearing ring, and a plurality of chambers between the two rings when assembled one outside the other and both rings brought to a closure.

5. In a compression and oil control piston ring, comprising a bearing ring split on one side and a carrier ring grooved about its circumference and split on one side, said carrier ring having flanged portions turned outwardly from the axis thereof thereby creating the said groove, and a plurality of webs projecting inwardly and disposed about the inside wall of said bearing ring, each web being of equal dimension radially, and a plurality of chambers between the two rings when assembled and brought to closure with the webs of the bearing ring seated to the floor of the carrier ring groove.

6. In a compression and oil control piston ring, comprising a bearing ring split on one side and a carrier ring grooved about its circumference and split on one side, said carrier ring having flanged portions turned outwardly from the axis thereof, thereby creating said groove, and a plurality of webs projecting inwardly and disposed about the inside wall of said bearing ring, each web being of equal dimension radially, and a plurality of chambers between the two rings when assembled and brought to a closure, the radial dimension of the chambers being less than the radial dimension of the flanges of the carrier ring, the diameter of which shall be less than the diameter of the bearing ring when the webs thereof are seated to the floor of the carrier ring groove.

HAZLETT M. HARDY.